United States Patent [19]
Fischer et al.

[11] Patent Number: 5,212,269
[45] Date of Patent: May 18, 1993

[54] MAIN CHAIN CHROMOPHORIC POLYMERS WITH SECOND ORDER NONLINEAR OPTICAL PROPERTIES

[76] Inventors: John Fischer, P.O. Box 659, Inyokern, Calif. 93527; Ronald Henry, 329 Perdew, Ridgecrest, Calif. 93555; James Hoover, 408 Vanessa Ave., Ridgecrest, Calif. 93555; Geoffrey Lindsay, 725 Scott Cir., Ridgecrest, Calif. 93555; John Stenger-Smith, 1133 Meadowview La., Ridgecrest, Calif. 93555; Andrew P. Chafin, 1565-A S. Downs St., Ridgecest, Calif. 93555

[21] Appl. No.: 680,717

[22] Filed: Mar. 25, 1991

[51] Int. Cl.$^5$ ............................................. C08G 63/685
[52] U.S. Cl. .................................... 526/266; 526/298; 526/312; 526/243; 526/244; 526/245; 526/248; 528/330; 528/331; 528/327; 528/332; 528/335
[58] Field of Search ............... 526/298, 245, 266, 312, 526/243, 244, 248; 528/327, 330, 331, 332, 335

[56] References Cited

U.S. PATENT DOCUMENTS 4,384,102  5/1983  Rogers ................................. 528/183
4,579,915  4/1986  Choe ..................................... 525/435

OTHER PUBLICATIONS

Stenger-Smith J. D. et al. (1990) Polymer Preprints 31(1), 375-376 (Mar. 29, 1990).
Stenger-Smith J. D. et al. (1990) Makromol Chem., Rapid Commun. 11(4), 141-144 (rec'd Jun. 5, 1990).
Hoover, J. M. et al. (1991) Polymer Preprints 32(1), 197-198 (Published Mar. 21, 1991).
Köhler, W. et al. (1991) Macromol. 24(16) 4589-4599.
J. Am. Chem. Soc. 1989, 111, 7554-7557, H. E. Katz & M. L. Schilling, "Head to Tail Assemblies of Bipolar", Piperazine Linked Chromophores: Synth. X-Ray, Structure, & Dielectric Characterization, Sep. 28, 1988.
Ber. Bunsenges. Phys. Chem. 91, 1304-1310 (1987), C. S. Willand and D. J. Williams, "Nonlinear Optical Properties of Polymeric Materials".

*Primary Examiner*—Joseph L. Schofer
*Assistant Examiner*—Mark Nagumo
*Attorney, Agent, or Firm*—Stuart H. Nissim; Melvin J. Sliwka; John L. Forrest, Jr.

[57] ABSTRACT

Processible chromophoric polymers having nonlinear optical properties and wherein the chromophore is present in and is a part of the polymer backbone, including substantially all of the monomer or repeat units, with the dipole moments pointing in the same direction (head-to-tail) along the polymer backbone. Such polymers include phenylene, phenylene vinylene, stilbenylene, phenyl piperdine, and coumarin polymers.

15 Claims, No Drawings

MAIN CHAIN CHROMOPHORIC POLYMERS WITH SECOND ORDER NONLINEAR OPTICAL PROPERTIES

BACKGROUND OF THE INVENTION

This invention relates to polymers having nonlinear optical properties, and is particularly concerned with main-chain chromophoric polymers with second-order nonlinear optical properties.

The field of nonlinear optics and electro-optics is concerned with the interactions of electromagnetic fields with media to produce new fields that are altered in phase, frequency, amplitude or other propagation characteristics from the incident field The best known nonlinear optical (NLO) effect is second harmonic generation (SHG) or frequency doubling. Optically nonlinear materials are used in frequency doublers for lasers, optical communications and computing equipment, laser resistant surfaces, and in opto-electronic devices for other applications.

Materials with second-order nonlinear optical properties include inorganic, organometallic, and organic crystals, which show good second-order nonlinear optics but it would be extremely difficult to use these materials as waveguides.

Nonlinear optical devices such as frequency doublers have been based almost exclusively on crystalline inorganic materials such as lithium niobate and potassium dihydrogen phosphate (KDP). The disadvantages of these materials include relatively slow response times to optical signals, poor laser damage resistance, relatively large dielectric constants, and difficulties in fabrication into opto-electronic devices.

Organic polymeric materials with large delocalized pi-electron systems exhibit very fast NLO responses, have large optical nonlinearities, low dielectric constants, large electro-optic coefficients, and the chemical synthesis of these material can be altered to optimize their desirable physical characteristics while preserving their NLO properties.

Polymeric NLO materials can have very good mechanical properties. They can be mechanically tough and easily fabricated or processed into thin film geometries that are very desirable for coatings and integration with microelectronics.

Two basic approaches exist for the synthesis of optically nonlinear polymers. One approach is to prepare guest-host materials by simply dissolving polarizable moieties (chromophores or dyes as the guest) in a polymeric host. This physical or solid solution may be severely limited in concentration of the dye due to solubility of the chromophore. Another disadvantage is the slow relaxation of dipole alignment with time.

The other approach is to synthesize polymers that have chromophores chemically attached as pendant side-chain substitutes. These dye-substituted polymers have several distinct advantages over guest-host materials including higher limiting concentrations of the chromophore, reduced mobility and enhanced orientational stability of the chromophore, and improved optical, thermal and mechanical properties.

Of all the previously known materials, perhaps the most promising are the main-chain chromophoric polymers having the chromophore chemically bonded to the polymer chain at two sites. These systems show good transmittance, stability and second-order optical properties.

In the article "Nonlinear Optical Properties of Polymeric Materials" by C. S. Willand et al., Ber Bunsenges, Phy. Chem. 91, pp. 1304–1310 (1987), nonlinear optical effects in main-chain systems such as copolymers derived from p-oxy-cyanocinnamate derivatives, are discussed. However, the low glass transition temperature of this copolymer makes it impossible to fabricate a stable, noncentrosymmetric film. In the more recent article "Head-to-Tail Assemblies of Dipolar, Piperazine-Linked Chromophores" by H. E. Katz, et al., J. Am. Chem. Soc. III, 7554–7557 (1989), a main-chain chromophoric oligomer has been reported. However, it is difficult to dissolve, and its fabrication into a nonlinear optical film has not been disclosed.

One object of the invention accordingly is the provision of novel polymers having nonlinear optical properties.

Another object is to provide main-chain chromophoric polymers having second-order nonlinear optical properties and a glass transition temperature ($T_g$) substantially above room temperature.

Another object is to provide main-chain chromophoric polymers having electro-optic properties and a glass transition temperature above 100° C.

Still another object is to provide optical films which ca be patterned by photoreaction techniques which may be useful holographic materials.

Yet another particular object is the provision of novel polymers derived from phenylene, phenylene vinylene, stilbenylene, phenyl piperdine, and coumarin, having the above characteristics.

SUMMARY OF THE INVENTION

According to the invention, processible chromophoric homopolymers and copolymers with the chromophores present in and a part of the polymer backbone i.e. a main-chain chromophore, and having second-order nonlinear optical properties and a relatively high glass transition temperature ($T_g$) are provided. Such polymers can be described by the following general model of the repeat units of the polymers:

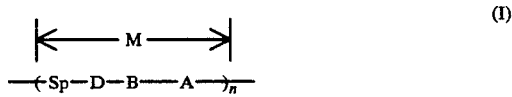

(I)

where D-B-A is a chromophore wherein:
- D is an electron donating group,
- A is an electron withdrawing or accepting group;
- B is a connector group that is electron conjugated, and which may contain 1 or more substituents, such as phenylene, phenylene vinylene, stilbenylene, phenyl piperdine, and coumarin;
- M is the monomer repeat unit;
- n is the number of repeat units or degree of polymerization, which can range from 2 to 10,000, e.g. about 20 to about 2,000 with a molecular weight ranging from about 400 to about 1,000,000: and,
- Sp is a spacer group between monomers or chromophores that is not conjugated.

It will be noted that in each unit (M above) of the polymer, the A and D components are in the same relative position, so that the polymer has dipole moments pointing in the same direction (head-to-tail) along the polymer backbone.

A representative polymer having the repeating unit (II) below was produced by polymerization of 4-(N-ethyl-N-(2-hydroxyethyl)) 2-cyanocinnamic acid:

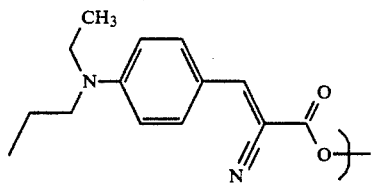

For both the general and specific cases of main-chain chromophoric polymers of the invention, the polymer (the dipoles) can be oriented electrically by placing them in an electric field at a temperature at or above their glass transition temperature or by mechanically orienting the films or fibers in the presence of an electric field to yield films or fibers that have second-order nonlinear optical properties.

DETAILED DESCRIPTION OF THE INVENTION AND PREFERRED EMBODIMENTS

Main-chain chromophoric polymers having second-order nonlinear optical characteristics and a relatively high $T_g$, preferably in excess of 70° C., in accordance with the model noted above, including those comprised of phenylene, phenylene vinylene, stilbenylene, phenyl piperdine, and coumarin groups. These polymers have dipole moments pointing in the same direction (heat-to-tail) along the polymer backbone. Such polymers can be represented generically by the formula below:

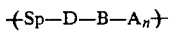

where D-B-A is a chromophoric unit in which:

D is an amine electron donating group —NR—, where $R_1$ is H, alkyl, or alkenyl having one to 22 carbon atoms;

A is one of the following electron accepting groups:

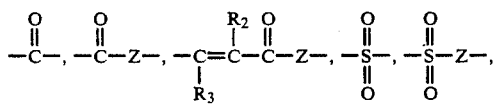

where Z is —O— or —NH—; where $R_2$ and $R_3$ are independently chosen from —H, —CH$_3$, —CF$_3$, —CN, —NO$_2$;

B is one of the following connector groups:

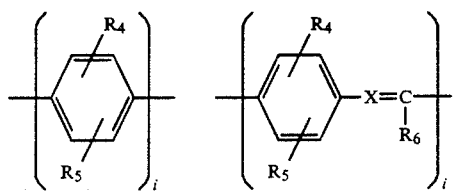

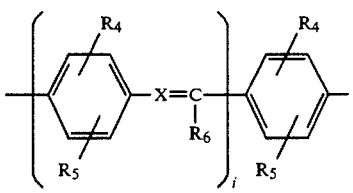

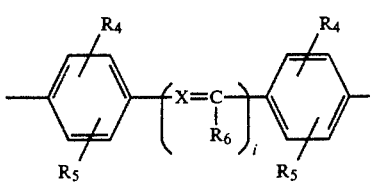

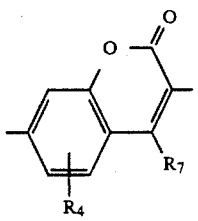 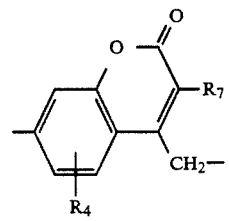

where:

X is —CH= or —N=;

$R_4$, and $R_5$ are independently chosen from —H, —CH$_3$, —CF$_3$, and —OR$_6$; where $R_6$ is H, alkyl, or alkenyl having one to 22 carbon atoms;

$R_7$ is independently chosen from —H, —CH$_3$, —CH$_3$, —CN, and —NO$_2$; and, i is 1 or 2, preferably 1;

Sp is the spacer group —(CH$_2$)$_{n'}$— or —(CF$_2$)$_{n'}$— where n' is 2 to 12; and, n is about 2 to about 10,000, e.g., about 20 to about 2000, the polymer having a molecular weight ranging from about 400 to about 200,000.

Thus, polymer II above, a cyanocinnamic acid polymer, is representative of cinnamic acid polymers of the invention. An alternative cinnamic acid polymer is the combined phenylene vinylene cinnamic acid polymer having the repeating unit below:

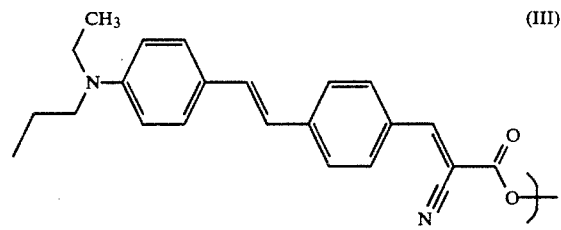

A somewhat similar polymer is that having the repeating unit below:

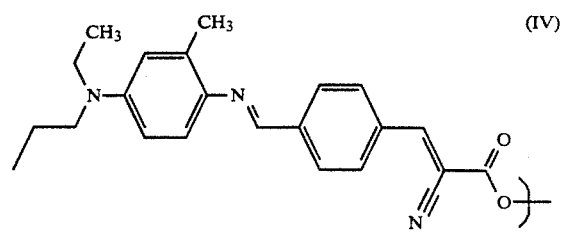

The following polymer is illustrative of stilbenylene polymers having the chromophore in the main polymer chain and having nonlinear optical properties according to the invention, such polymer having the repeating unit:

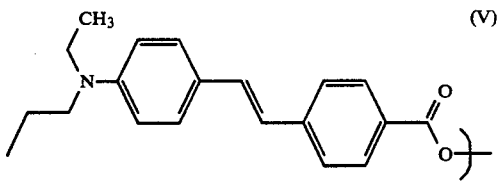

(V)

The following polymer is illustrative of phenyl piperdine polymers having the chromophore in the main polymer chain and having nonlinear optical properties according to the invention, such polymer having the repeat unit:

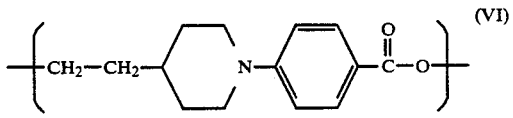

(VI)

The following polymer is illustrative of coumarin polymers having the chromophore in the main polymer chain and having nonlinear optical properties according to the invention, such polymer having the repeat unit:

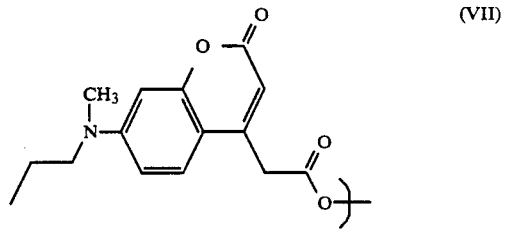

(VII)

Copolymers of comprised of several repeat units (II, III, IV, V, VI & VII) are preferred compositions of this invention because the copolymers are typically totally amorphous which eliminates optical scattering due to crystallinity.

The polymers of the present invention, as exemplified by repeat units II, III, IV, V, VI, and VII above, have a molecular weight ranging from about 400 to about 1,000,000, preferably about 2,000 to about 200,000. The number of repeating units in such polymers can accordingly range from about 2 to about 10,000, preferably about 20 to about 2,000. The invention thus includes oligomers as well as medium and high molecular weight polymers and copolymers.

The main-chain chromophoric polymers of the invention can be prepared by various known procedures. These include esterification and transesterification and other condensation procedures including the Knoevenagel reaction, Schiff base formation, Wittig reaction trans-amidification, and amidification.

Some of the novel head-to-tail main-chain chromophoric polymers of the invention noted above are soluble in common solvents such as chloroform, methylene chloride, meta-cresol, and dimethyl formamide, and can be processed into nonlinear optical films by conventional methods such as electric field poling and corona onset poling.

The following are examples of practice of the invention.

EXAMPLE 1 a) Preparation of N-(2-Benzoyloxyethyl)-N-ethylamine

Benzoyl chloride (7.8 mL, 66 mmol) was added dropwise to a stirring solution of (N-ethyl-N-(2-hydroxyethyl)aniline (10 g, 60 mmol) in THF (200 ML) containing triethyl amine (9.2 g, 66 mmol) at room temperature. The mixture formed a thick precipitate which was stirred for 18 hours and then poured into water (400 mL). The aqueous layer was extracted with ethyl acetate (3×200 mL). The combined organic extracts were washed successively with 1 molar hydrochloric acid (100 mL), saturated sodium bicarbonate (100 mL), water (100 mL), saturated sodium chloride (100 mL), dried over magnesium sulfate and the solvent was removed under reduced pressure to yield the product (16.4 g, 96% yield) as a dark green oil.

$^1$H NMR (Acetone-$d_6$) 6.6–8.1 (m, 10H); 4.48 (t, J=6 Hz, 2H); 3.73 (t, J=6 Hz, 2H); 3.70 (q, J=7 Hz, 2H); 1.16 (t, J=7 Hz, 3H).

$^{13}$C NMR (Acetone-$d_6$) 166.9, 149, 133.8, 130.3, 130,0, 129.3, 117.1, 113.4, 63.4, 49.7, 45.8, 12.7.

IR (Neat) (cm$^{-1}$) 3080, 2970, 1720, 1600, 1510, 1455, 1380.

b) Preparation of 4-Formyl-N-ethyl-N-(2-benzoyloxyethyl)aniline

Phosphorous oxychloride (0.33mL, 3.5 mmol) was added to dry dimethylformamide (3 mL) at 0° C. for 15 minutes. After cooling to room temperature, N-ethyl-(2-benzoyloxyethyl)aniline (1 g, 3.5 mmol) was added followed by stirring at room temperature for 5 minutes and then at 90° C. for 30 minutes. The dark green solution was then cooled to room temperature and made basic to pH 8 by addition of 1 molar sodium hydroxide solution. Product was extracted into diethyl ether (3×20 mL). The combined ether extracts were washed with water (30 mL), saturated sodium chloride (30 mL), dried over magnesium sulfate and solvent removed under reduced pressure. Product was isolated as a clear yellow oil (0.90 g, 82% yield).

$^1$H NMR (Acetone-$d_6$) 9.75 (s, 1H(; 8.05 (m, 2H); 7.5 (m, 3H); 7.8 (d, J=9 Hz, 2H); 6.96 (d, J=9 Hz, 2H); 4.53 (t, J=6 Hz, 2H); 3.85 (t, J =6 Hz, 2H); 3.65 (q, J=7 Hz, 2H); 1.20 (t, J =7 Hz, 3H).

$^{13}$C NMR (Acetone-$d_6$) 195.0, 166.9, 155.6, 133.9, 132.5, 131.1, 130.3, 130.0, 129.4, 126.8, 63.0, 49.4, 46.0, 12.5.

IR (Neat) (cm$^{-1}$) 3070, 2980, 2740, 1725, 1680, 1525.

c) Preparation of N-Ethyl-N-(2-hydroxyethyl)-4-formylaniline starting material

4-Formyl-N-ethyl-N-(2-benzoyloxyethyl)aniline (16 g, 51 mmol) was added to a stirring suspension of potassium carbonate (9 g, 65 mmol) in methanol (150 mL) and water (50 mL). Stirring was continued at room temperature for 4 hours followed by addition of 1 molar hydrochloric acid (250 mL) and extraction into diethyl ether (3×100 mL). The combined ether layers were washed with saturated sodium bicarbonate (200 mL), water (200 mL), saturated sodium chloride (200 mL), dried over magnesium sulfate and the solvent was removed under reduced pressure. The crude product was purified using a silica gel chromatography column eluting with 50% ethyl acetate in hexane which gave the compound as a clear yellow oil (5 g, 51% yield).

d) Preparation of 4-N-ethyl-N-(2-hydroxyethyl)amino-α-cyanocinnamic acid

Cyano-acetic acid (0.44 g, 5.2 mmol) in THF (5 mL) was added to a solution of lithium diisopropylamide (16 mmol) in THF (50 mL) stirring at 0° C. under dry nitrogen. A thick white precipitate formed. After 5 minutes, N-ethyl-N-(2-hydroxyethyl)-4-formylaniline (1 g, 5.2 mmol) in THF (5 mL) was added at 0° C. The color changed from white to orange. Stirring was continued for 18 hours while slowly warming to room temperature. The orange suspension was poured into 1 molar hydrochloric acid (50 mL) and the orange precipitate dissolved. This dark orange solution was then extracted with ether (3×30 mL). The combined organic extracts washed with water (30 mL), saturated sodium chloride (30 mL), dried over magnesium sulfate and the solvent was removed under reduced pressure to give an orange oily solid which was recrystallized from ethyl acetate and hexane. Desired product was isolated as a light orange solid (MP 178°–180° C.). ELEMENTAL ANALYSIS: Calculated for $C_{14}H_{16}N_2O_3$: C 64.60, H: 6.22, N 10.76; Found: C 64.65, H 6.24, N 10.36.

e) Polymerization of 4-[N-ethyl-N-(2-hydroxyethyl)amino1-α-cyanocinnamic acid to form polymer II.

Dicyclohexylcarbodiimide (0.1055 g, 0.5 mmol) and 4-[N-ethyl-N-(2-hydroxyethyl amino]-α- cyanocinnamic acid (0.1322 g, 0.5 mmol) were placed in a 15 mL flask and spectroscopic grade methylene chloride (6 mL) was added. The mixture formed a suspension (not all of the cinnamic acid derivative dissolved) and was stirred for 5 min at room temperature. 4-Dimethylaminopyridine (0.015 g, 0.1 mmol) was added and almost immediately the organic insoluble material disappeared and a white precipitate (dicyclohexylurea) was observed. The mixture was stirred at room temperature overnight and filtered. The solvent was removed under pressure, and the remaining orange solid was dissolved in chloroform (5 mL). This solution was then passed through a preparative GPC column and only fractions with molecular weights higher than about 2000 (versus polystyrene standard) were collected. (Yield of this fraction: 30%). Degrees of polymerization of collected fractions ranged from about 10 to 50 (based on a standard polystyrene GPC calibration).

The $T_g$ of polymers produced by the above procedure from its acid functional monomer varied between 60° and 90° C. The polymer was soluble in chloroform, m-cresol and methylene chloride.

EXAMPLE 2 a) Preparation of Ethyl (4-N-ethyl-N-(2-hydroxyethyl)amino)-α-cyanocinnamate (II)

Ethyl cyanoacetate (0.59 g, 5.2 mmol), (N-ethyl-N-(2-hydroxyethyl)-4-formylaniline (1 g, 5.2 mmol), piperidine (5 drops) and glacial acetic acid (10 drops) were mixed in benzene (125 mL) and refluxed for 18 hours in a Dean-Stark apparatus. The orange solution was cooled to room temperature an all volatiles were removed under reduced pressure. The viscous dark orange oil residue was purified on a florisil chromatography column eluting with 50% ethyl acetate in hexane followed by recrystallization from ethyl acetate an hexane. The product was isolated as a yellow solid (0.95 g, 64% yield, melting point 72°–75° C.

b) Polymerization of Ethyl (4-N-ethyl-N-(2-hydroxyethyl)amino)-α-cyanocinnamate

Ethyl 4-N-ethyl-N(2-hydroxyethyl)amino-α-cyanocinnamate (0.74 g, 2.56 mmol) and 1 small drop of dibutyltindilaurate (0.0096, 0.015 mmol) were placed in a 25 mL round bottom flask equipped with a stir bar and then the system was evacuated and purged with dry nitrogen. The system was then kept on dry nitrogen purge and lowered into a pre-heated 160° C. oil bath and stirred. After 1 hour the material in the flask was very viscous (almost solid), and the system was then evacuated and kept at 160° C. for several hours. The system was then cooled to room temperature under vacuum, the polymer was dissolved in chloroform and the solution either eluted through the preparative GPC where only fractions with molecular weights higher than 2000 were collected, or the polymer was precipitated into hexane.

The $T_g$ of polymers prepared by the above method from the ester functional monomer was between 100° and 110° C.

EXAMPLE 3 a) Preparation of Methyl 4'-[N-Ethyl-N-(2-hydroxyethyl)-aminolstilbene-4-formate (V)

A quantity of p-Methylcarboxy benzyl triphenylphosponium chloride (7.6 g, 17 mmol) was added in one portion to a solution of lithium diisopropyl amide (17 mmol) in tetrahydrofuran (150 mL) at 0° C. The resulting orange suspension was stirred for 15 minutes at 20° C. under a nitrogen atmosphere. p-(N-ethyl, N-2-t-butyldimethyl siloxy ethyl)-benzaldehyde (5.2 grams, 17 mmol) dissolved in tetrahydrofuran (10 mL) was then added in one portion and the resulting orange suspension was refluxed with stirring for 18 hours under a nitrogen atmosphere. The clear dark orange solution was then cooled to ambient temperature and the solvent was removed under reduced pressure to yield an orange-yellow solid which was purified on a silica gel chromatography column eluting with 20% ethyl acetate in hexane. A yellow oil was collected as recrystallized from ethyl acetate-hexane. (Yield of this solid is 1.65 grams, 22%).

The O-silylated dye (1.45 g, 3.3 mmol) was dissolved in a mixture of acetic acid (25 mL) and water (5 mL) and stirred at ambient temperature for 3 days. Volatiles were then removed under reduced pressure and the yellow residue was recrystallized from ethyl acetate-hexane to give the desired dye in 73% yield (0.78 grams).

b) Polymerization of Methyl 4'-[N-Ethyl-N-(2-hydroxyethyl)-aminolstilbene-4-formate Into a 15 mL round bottom flask equipped with a stir bar were placed Methyl 4'-[N-Ethyl-N-(2-hydroxyethyl-amino]stilbene-4-formate (0.322 g, 0.944 mmol) and a catalytic amount of dibutyltindilaurate. The flask was placed under nitrogen purge and lowered into a pre-heated 165° C. oil bath. After 1 hour the system was hooked up to vacuum and left to react for another 2 hours. The flask was removed from heat and allowed to cool, and then the partially crystalline contents of polymer V were removed from the flask.

c) Film Formation

Glassy films of the polymer were made by heating the material (placed on a microscope slide) to about 235° C. At this temperature the polymer melted and films could be made by drawing a doctor knife across the slide. The melt transition is irreversible, possibly due to further polymerization, and a material with a glass transition temperature of about 125° C. is the result of the heat treatment. The polymer is insoluble in most organic solvents, and about 0.7 weight percent soluble in 135° C. meta cresol.

EXAMPLE 4 a) Coumarin Monomer Synthesis (VII)

A melt of resorcinol (24 g) and 2-(methylamino)-ethanol was flushed with nitrogen and heated under an air condenser in an oil bath at 175°–180° C. for 6 hours. The temperature was then raised to 198°–201° C. and held for 1.5 hours. After the purple viscous mass had cooled, it was dissolved in 150 mL of boiling ethyl acetate. The solution was chilled overnight at 5° C. after which the supernatant was decanted from the separated tar and evaporated. The yield of product suitable for use in the next synthetic step was about 30 g.

Dimethyl acetonedicarboxylate (13.9 g), 13.6 grams of the product from the previous step, 3.0 grams of anhydrous zinc chloride and 35 mL of methanol were refluxed for 23.5 hours. After cooling, the solution was poured over 60 g of ice, 20 mL of water and 3 mL of concentrated hydrochloric acid. The purple oil which separated was extracted into methylene chloride. The methylene chloride solution was washed once with cold water, dried over sodium sulfate, filtered and evaporated (yield 13.6 g of semi-solid). After 2 days at room temperature the solid was filtered from the liquid, washed twice with $-20°$ C. methanol, and dried. Yield 1.34 g, MP 150°–154° C. This material was then recrystallized from methanol to give yellow-orange plates, MP 158.5°–160° C. The $_1$H NMR spectrum for this compound was consistent with that expected formethyl 7-[N-methyl-N-(2-hydroxyethyl)amino]coumarin-4-acetate. Elemental analysis for nitrogen: for $C_{15}H_{17}NO_5$, %N expected: 4.81; found: 4.93.

b) Polymerization of methyl 7-[N-methyl-N(2-hydroxyethyl)amino1coumarin-4-acetate Into a 15 mL round-bottom flask equipped with a stir bar were placed 0.588 grams (2.1 mmol) of methyl 7-[N-methyl-N-(2-hydroxyethyl)amino]coumarin-4-acetate and 0.013 grams (0.02 mmol) of dibutyltindilaurate under nitrogen purge. The system was continuously purged with dry nitrogen, lowered into a pre-heated oil bath (160° C.), and stirred. After 1 hour the material in the flask was very viscous (almost solid). The system was then evacuated and kept at 160° C. for several hours. The resulting glassy polymer VII was soluble in m-cresol.

The polymer was precipitated by pouring a m-cresol solution of the polymer into methanol, stirring for 2 hours at room temperature and filtering (95% yield).

The polymer was then dried at room temperature for 24 hours. For IR Spectroscopy and Thermal analysis, the polymer was dried at 200° C. for about 30 minutes to remove trace amounts of m-cresol.

EXAMPLE 5 a) Synthesis of 1-(4'-Methoxycarbonylphenyl)-4-(2-hydroxyethyl)piperdine (VI)

A solution of 9.84 grams of methyl 4-fluorobenzoate (63.9 mmol) and 12.40 grams of 4-(2-hydroxyethyl)piperdine (96 mmol) in 50 mL N-methylpyrrolidin-2-one was heated to 110°–120° C. and stirred for 72 hours. The dark solution was cooled and poured into 400 mL water. The tan precipitate was filtered off and washed well with water to yield 11.89 grams of crude product as a tan powder (71%). The crude material was recrystallized once from 100 mL ethanol which gave 4.75 grams (40% recovery) of a tan powder. Melting point 110°–115° C. $^2$H NMR $\delta$ (acetone-d$_6$): 1.27 (2H, quad of doub, J=3.8 hz & 12.2 hz); 1.47 (2H, quad, J=6.6 hz); 1.71 (1H, mult); 1.80 (2H, br doub); 2.83 (2H, trip of doub, J=2.5 hz & 12.6 hz); 3.62 (2H, trip, J=6.6 hz); 3.78 (3H, s); 3.92 (2H, br doub); 6.93 (2H, doub); 7.81 (2H, doub). $^{13}$C NMR $\delta$ (acetone-d$_6$): 32.59, 33.36, 40.30, 48.61, 51.55, 59.81, 114.30, 119.26, 132.0, 155.29, 167.18.

b) Polymerization of 1-(4'-Methoxycarbonylohenyl)-4-(2-hydroxyethyl)piperdine 1-(4'-Methoxycarbonylphenyl)-4-(2-hydroxyethyl)-piperdine (1.26 g, 5.1 mmol) and 1 small drop of dibutyltindilaurate (0.01 g, 0.016 mmol) were placed in a 20 mL round bottom flask equipped with a stir bar and then the system was evacuated and purged with dry nitrogen (3 times). The system was kept on dry nitrogen purge and lowered into a pre-heated 175° C. oil bath and stirred. After 1 hour the material in the flask was very viscous (almost solid), and the system was then evacuated and kept at 170° C. overnight. The polymer was then dissolved in m-cresol, filtered and precipitated into methanol. The polymer was then filtered and dried. Thermal analysis of this polymer indicates a T$_g$ around 120° C. with evidence of melting at around 200° C. followed by evidence of degradation at temperatures higher than 220° C.

EXAMPLE 6

Copolymerization of Ethyl 4-N-ethyl-N-(2-hydroxyethyl)amino-α-cyanocinnamate and Methyl 4'-[N-Ethyl-N-(2-hydroxyethyl)amino1stilbene-4-formate Ethyl 4-N-ethyl-N-(2-hydroxyethyl)amino-α-cyanocinnamate (0.57 g, 1.97 mmol), Methyl 4'-[N-Ethyl-N-(2-hydroxyethyl)amino]stilbene-4-formate (0.716 g, 2.1 mmol) and 1 small drop of dibutyltindilaurate (0.013 g, 0.02 mmol) were placed in a 10 mL round bottom flask equipped with a stir bar and then the system was evacuated and purged with dry nitrogen (3X). The system was then kept on dry nitrogen purge and lowered into a pre-heated 170° C. oil bath and stirred. After 1 hour the material in the flask wa very viscous (almost solid), and the system was then evacuated and kept at 160° C. for several hours. The system was then cooled to room temperature under vacuum. The copolymer was dissolved in chloroform and the solution was precipitated into hexane. The copolymer prepared by this method was soluble in chloroform an m-cresol, the $T_g$ of this polymer was found to be around 100° C.

A novel feature of the main-chain chromophoric homopolymers and copolymers of the invention is that the dipoles lie parallel to the polymer backbone and are directly bonded head-to-tail to one another. This means that it is possible to get even better second-order nonlinear optical properties, and because the chromophores are part of the polymer main-chain, they tend to be more rigidly held in place, which increases the stability of the second-order nonlinear optical properties. Another advantage is that every polymer repeat unit has a chromophore, therefore the chromophore density is higher than for previously reported polymers with nonlinear optical properties.

From the foregoing it is seen that the invention provides for the preparation of processible homopolymers, e.g. of phenylene, phenylene vinylene, stilbenylene, phenyl piperdine, and coumarin, and copolymers thereof having nonlinear optical properties and wherein the chromophores are in the polymeric backbone, including substantially all the repeat units, with the dipole moments pointing in the sam direction (head-to-tail) along the polymer backbone. Such molecular configuration offers a very high chromophore density, high $T_g$ and a potentially more stable alignment than side chain chromophore polymers.

Since various changes and modifications can be made in the invention without departing from the spirit of the invention, the invention is not to be taken as limited except by the scope of the appended claims.

What is claimed is:

1. Main-chain chromophoric processible homopolymers and copolymers
having nonlinear optical properties and defined by the general formula:

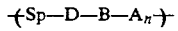

where D-B-A is a chromophoric unit in which:

D is an amine electron donating group —NR$_1$—, where R$_1$ is selected from the group consisting of H, alkyl, and alkenyl having one to 22 carbon atoms;

Sp is the spacer group selected from the group consisting of —(CH$_2$)$_{n'}$— and —(CF$_2$)$_{n'}$—, where n' is 2 to 12;

A is selected from the following electron accepting groups:

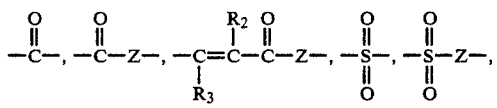

where Z is selected from the group consisting of —O—, and —NH—; where R$_2$ and R$_3$ are selected from the group consisting of —H,— CH$_3$, —CF$_3$, —CN, and —NO$_2$; and, where B is selected from one of the following connector groups:

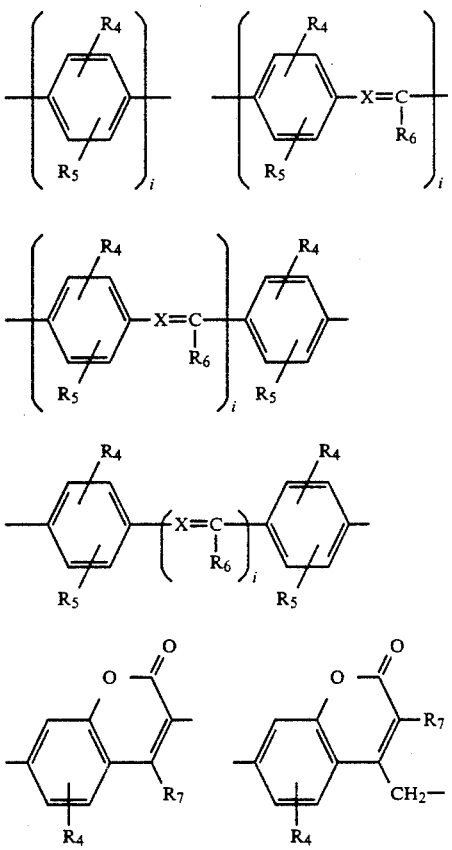

where X is —CH= or nitrogen; R$_4$ and R$_5$ are each selected from the group consisting of —H, —CH$_3$, —CF$_3$, and OR$_6$, where R$_6$ is selected from the group consisting of H, alkyl, and alkylene having one to 22 carbon atoms; R$_7$ is selected from the group consisting of —H, —CH$_3$, —CF$_3$, —CN, and —NO$_2$; and i is 1 to 2: and n is about 2 to about 10,000 wherein the Sp—D—B—A— units are oriented in a head-to-tail configuration.

2. The polymers of claim 1, selected from the group consisting of cinnamic acid, phenyl, stilbene and coumarin polymers, said polymers having a molecular weight ranging from about 400 to about 1,000,000.

3. The polymers of claim 2, wherein n is about 3 to about 2,000, said polymers having a molecular weight ranging from about 400 to about 200,000.

4. A polymer as defined in claim 1, said polymer being a cyanocinnamic acid polymer.

5. A polymer as defined in claim 1, having the repeating unit:

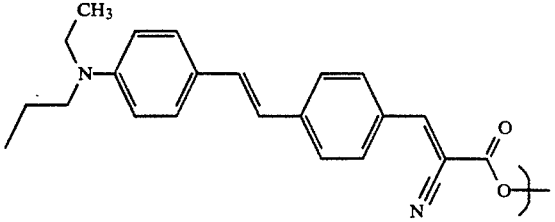

6. A polymer as defined in claim 1, having the repeating unit:

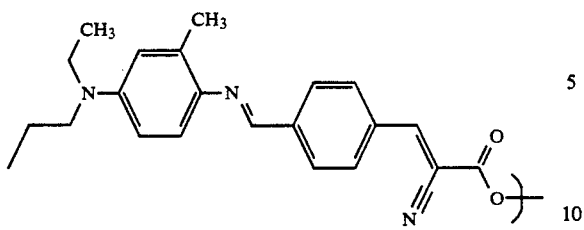

7. A polymer as defined in claim 1, having the repeating unit:

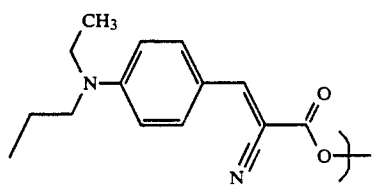

8. A polymer as defined in claim 1, having the repeating unit:

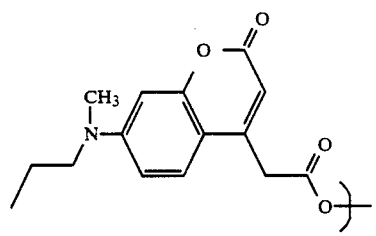

9. A polymer as defined in claim 1, having the repeating unit:

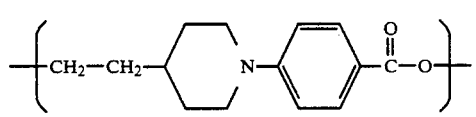

10. A polymer as defined in claim 1, having the repeating unit:

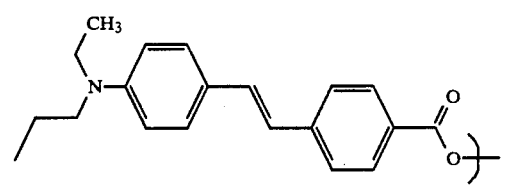

11. An optically nonlinear film comprising a polymer of claim 1.

12. A device comprising a film in accordance with claim 11.

13. Main-chain chromophoric processable homopolymers and copolymers having nonlinear optical properties and characterized by the recurring monomeric unit selected from the group consisting of:

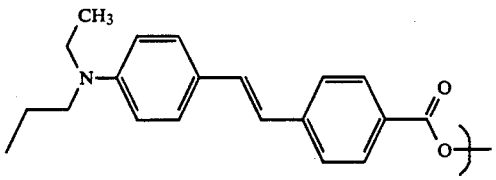

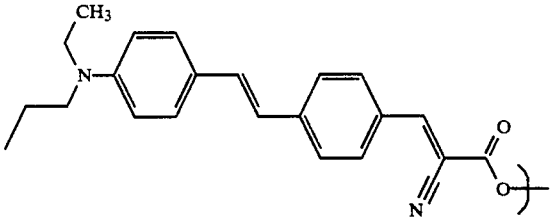

14. An optically nonlinear film comprising a polymer of claim 13.

15. A device comprising a film in accordance with claim 14.